(12) United States Patent
Ichihashi

(10) Patent No.: US 10,379,321 B2
(45) Date of Patent: Aug. 13, 2019

(54) LENS DRIVE DEVICE AND ELECTROMAGNETIC DRIVE UNIT

(71) Applicant: TDK CORPORATION, Tokyo (JP)

(72) Inventor: Shusuke Ichihashi, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 15/891,503

(22) Filed: Feb. 8, 2018

(65) Prior Publication Data

US 2018/0224631 A1    Aug. 9, 2018

(30) Foreign Application Priority Data

Feb. 9, 2017    (JP) .............................. 2017-021986

(51) Int. Cl.
| | | |
|---|---|---|
| *G02B 7/02* | (2006.01) | |
| *G02B 7/08* | (2006.01) | |
| *G03B 3/10* | (2006.01) | |
| *G02B 13/00* | (2006.01) | |
| *H01H 47/22* | (2006.01) | |
| *H02K 41/03* | (2006.01) | |
| *H04N 5/225* | (2006.01) | |

(52) U.S. Cl.
CPC ............. *G02B 13/001* (2013.01); *G02B 7/08* (2013.01); *G03B 3/10* (2013.01); *H01H 47/22* (2013.01); *H04N 5/2253* (2013.01); *G02B 7/02* (2013.01); *H02K 41/03* (2013.01); *H04N 5/2254* (2013.01)

(58) Field of Classification Search
CPC ... G02B 7/02; G02B 7/04; G02B 7/08; G02B 7/09; G02B 13/001; H04N 5/2253; H04N 5/2254; H01H 47/22; H01H 47/36; G03B 3/10; G03B 3/12; H02K 41/02; H02K 41/03; H02K 41/0365

USPC ............... 359/811, 814, 823, 824, 554, 557, 359/694–696; 310/12.04, 12.16, 12.22, 310/12.24

See application file for complete search history.

(56) References Cited

U.S. PATENT DOCUMENTS

| | | | | |
|---|---|---|---|---|
| 5,057,723 A | * | 10/1991 | Umehara | ........... H02K 41/0356 310/12.04 |
| 8,040,624 B1 | * | 10/2011 | Miyazaki | ........... H02K 41/0356 359/694 |
| 8,817,375 B2 | * | 8/2014 | Motoike | .................. G03B 5/00 359/554 |
| 8,964,316 B2 | * | 2/2015 | Ohno | ....................... G02B 7/09 359/823 |

(Continued)

FOREIGN PATENT DOCUMENTS

JP         2013-24938 A    2/2013

*Primary Examiner* — Loha Ben

(74) *Attorney, Agent, or Firm* — Oliff PLC

(57) ABSTRACT

A lens drive device includes a movable portion, a fixed portion, and a nonmagnetic case. The movable portion includes a double-pole magnet having two pairs of magnetic poles, a first coil opposing to the double-pole magnet in a perpendicular direction to a light axis, and a lens holder being movable to the double-pole magnet in a direction of the light axis. The fixed portion includes a second coil arranged so as to oppose to the double-pole magnet in the direction of the light axis. The nonmagnetic case is attached to the fixed portion so as to cover the movable portion. The double-pole magnet includes a first section and a second section. L1/L2 is 0.9 to 1.1, where L1 and L2 are respectively a length of the first and second sections in the direction of the light axis.

17 Claims, 13 Drawing Sheets

(56) References Cited

U.S. PATENT DOCUMENTS

| | | | |
|---|---|---|---|
| 9,036,260 B2 * | 5/2015 | Sugawara | G02B 7/08 359/557 |
| 9,500,878 B2 * | 11/2016 | Sugawara | G02B 7/08 |
| 9,835,872 B2 * | 12/2017 | Sugawara | G02B 7/08 |
| 2013/0016427 A1 | 1/2013 | Sugawara | |
| 2015/0226978 A1 | 8/2015 | Sugawara | |
| 2017/0031174 A1 | 2/2017 | Sugawara | |
| 2018/0224624 A1 * | 8/2018 | Ichihashi | G02B 7/04 |

* cited by examiner

LENS DRIVE DEVICE AND ELECTROMAGNETIC DRIVE UNIT

BACKGROUND OF THE INVENTION

1. Field of the Invention

The present invention relates to a lens drive device favorably used for a camera module of mobile phones, for example, and to an electromagnetic drive unit including the lens drive device.

2. Description of the Related Art

In accordance with downsizing of mobile communication terminal, lens drive devices favorably used for a camera module of mobile communication terminal, such as mobile phones, are required not only to reduce their size but also to be arranged densely and closely to other electronic components and devices included in mobile communication terminal. For example, if the lens drive devices can be arranged closely to antenna, speaker, other lens drive devices, or the like included in mobile communication terminal, this is advantageous for downsizing of mobile communication terminal.

On the other hand, a magnet included in the lens drive devices should form a magnetic field that is needed for driving a lens at least around a coil of the lens drive devices. In conventional lens drive devices having a magnet for relatively moving a lens, a magnetic field formed by a magnet of the lens drive devices may adversely affect other electronic components and devices included in mobile communication terminal, which may disturb high-density mounting.

Patent Document 1: JP 2013-24938A

SUMMARY OF THE INVENTION

The present invention has been achieved under such circumstances. It is an object of the invention to provide a lens drive device capable of reducing its size, preventing magnetic leakage and magnetic interference with other devices, and capable of being mounted densely, and provide an electromagnetic drive unit including the lens drive device.

To achieve the above object, the lens drive device according to the present invention is a lens drive device comprising:

a movable portion including a double-pole magnet having two pairs of magnetic poles, a first coil opposing to the double-pole magnet in a perpendicular direction to a light axis, and a lens holder holding the first coil and a lens and being movable to the double-pole magnet in a direction of the light axis;

a fixed portion including a second coil arranged so as to oppose to the double-pole magnet in the direction of the light axis;

a support portion configured to support the movable portion so that the movable portion is movable relatively to the fixed portion in the perpendicular direction to the light axis; and a nonmagnetic case provided with a through hole where light enters into the lens and attached to the fixed portion so as to cover the movable portion, wherein the double-pole magnet includes a first section having a first magnetization direction and opposing to the first coil and a second section having a second magnetization direction different from the first magnetization direction and opposing to the second coil, and L1/L2 is 0.9 to 1.1, where L1 is a length of the first section in the direction of the light axis, and L2 is a length of the second section in the direction of the light axis.

In the lens drive device according to the present invention, a magnetic field for driving the lens is formed around the first and second coils using the double-pole magnet. Since the double-pole magnet is used, a formation range of magnetic field can concentrate around the first and second coils, and magnetic flux can be prevented from leaking toward the outside of the lens drive device, compared to when using a normal magnet having a pair of N-pole and S-pole. Thus, the lens drive device with the double-pole magnet can prevent magnetic interference with other devices and can be mounted densely on mobile communication terminal or so.

In addition, since L1/L2 is 0.9 to 1.1, where L1 is a length of the first section in the direction of the light axis, and L2 is a length of the second section in the direction of the light axis, magnetic flux can be prevented more effectively from leaking toward the outside of the lens drive device. Since the case is nonmagnetic, the lens drive device according to the present invention does not have a problem of magnetization of the case based on a positional change of the double-pole magnet or a problem of adverse effect on movement of the double-pole magnet due to magnetization of the case. Thus, the lens drive device according to the present invention is advantageous in reducing its size.

For example, the movable portion may include a yoke arranged on an outer side surface opposite to an inner side surface facing the first coil among side surfaces of the double-pole magnet.

When the yoke is arranged on the outer side surface, magnetic flux of the double-pole magnet can effectively concentrate around the first and second coils, and magnetic flux can be prevented from leaking toward the outside of the lens drive device.

For example, the yoke may cover the whole of a first outer side surface in the first section of the outer side surface and may cover a part of a second outer side surface in the second section of the outer side surface, and a distance between the yoke and the fixed portion may be larger than a distance between the double-pole magnet and the fixed portion.

When the yoke covers the whole of the first outer side surface, magnetic flux can be effectively prevented from leaking toward the outside of the lens drive device. When the yoke covers a part of the second outer side surface of the outer side surface and a distance between the yoke and the fixed portion is larger than a distance between the double-pole magnet and the fixed portion, a distance between the double-pole magnet and the second coil can be reduced while magnetic flux is prevented from leaking toward the outside of the lens drive device and a gap between the movable portion and the fixed portion is maintained appropriately.

For example, the movable portion may have four double-pole magnets respectively arranged along a side of a rectangle surrounding the lens holder, and the movable portion may have at least two yokes arranged on an outer side surface opposite to an inner side surface facing the first coil among side surfaces of the double-pole magnet and arranged correspondingly to two double-pole magnets arranged vertically to each other among the four double-pole magnets.

When the movable portion has four double-pole magnets arranged to surround the lens holder, a drive force generated by the first coil can be strengthened. When at least two yokes are arranged correspondingly to two double-pole magnets arranged vertically to each other, magnetic flux can be particularly effectively prevented from leaking toward one side of the lens drive device. Thus, the lens drive device can achieve a more effective high-density mounting by arranging other devices on a side where magnetic flux leaks less. Since the yokes are arranged in both the X-axis direction and the Y-axis direction among perpendicular directions to the light axis, a drive force in the X-axis direction and a drive force in the Y-axis direction can be aligned easily even if the size of the magnet is adjusted in accordance with an arrangement of the yokes.

For example, the movable portion may have the four double-pole magnets respectively arranged along a side of a rectangle surrounding the lens holder, and the movable portion may have at least two yokes arranged on an outer side surface opposite to an inner side surface facing the first coil among side surfaces of the double-pole magnet and arranged correspondingly to two double-pole magnets arranged in parallel to each other among the four double-pole magnets.

When the movable portion has four double-pole magnets arranged to surround the lens holder, a drive force generated by the first coil can be strengthened. When at least two yokes are arranged correspondingly to two double-pole magnets arranged in parallel to each other, magnetic flux can be particularly effectively prevented from leaking toward both sides of the lens drive device in the width direction. Thus, the lens drive device can achieve a more effective high-density mounting by arranging other devices on a side where magnetic flux leaks less. Since the yokes are arranged on both sides of the X-axis direction among perpendicular directions to the light axis, magnetic interference can be prevented effectively even if a plurality of the lens drive devices and other devices are arranged side by side in the X-axis direction, for example.

For example, the movable portion may have four double-pole magnets respectively arranged along a side of a rectangle surrounding the lens holder, and at least one of the four double-pole magnets may be different from another double-pole magnet arranged in parallel to the double-pole magnet with respect to thickness in the perpendicular direction to the light axis.

When the movable portion has four double-pole magnets arranged to surround the lens holder, a drive force generated by the first coil can be strengthened. When the double-pole magnet is thinned, magnetic flux is prevented from leaking toward a side where the thinned double-pole magnet is arranged. Thus, the lens drive device can achieve a more effective high-density mounting by arranging other devices on a side where magnetic flux leaks less.

For example, the movable portion may have a yoke arranged on an outer side surface opposite to an inner side surface facing the first coil among side surfaces of the double-pole magnet and arranged correspondingly to the double-pole magnet where the thickness is relatively small.

When the yoke is arranged on the double-pole magnet having a small thickness, magnetic flux can be more effectively prevented from leaking toward a side where the thinned double-pole magnet is arranged. Thus, the lens drive device can achieve a more effective high-density mounting by arranging other devices on a side where magnetic flux leaks less. When the yoke is arranged on the double-pole magnet having a small thickness, it becomes easier to adjust weight to a side where the double-pole magnet having a large thickness is arranged, and the lens drive device is thereby excellent in weight balance and is capable of preventing inclination of the light axis or so.

An electromagnetic drive unit according to the present invention, comprising:

any of the lens drive devices; and an electromagnetic drive device arranged with a predetermined distance to the lens drive device and including an external coil and an external magnet configured to move relatively by electromagnetic drive force, wherein a magnetic force received by the external coil from the double-pole magnet is smaller than a magnetic force received by the external coil from the external magnet.

In the electromagnetic drive unit, the electromagnetic drive device is prevented from being affected by magnetic flux leaking from the double-pole magnet of the lens drive device, and a relative movement between the external coil and the external magnet can be thereby achieved favorably by mutual interaction between the external coil and the external magnet.

For example, the electromagnetic drive device may include an external lens configured to be driven separately from the lens of the lens drive device by electromagnetic drive force of the external coil and the external magnet, and the lens drive device and the electromagnetic drive device may constitute a dual lens drive device.

The electromagnetic drive unit can achieve a compact and high-performance dual lens drive device where two lens consisting of a lens and an external lens are arranged closely to each other.

DESCRIPTION OF THE PREFERRED EMBODIMENTS

Hereinafter, the present invention is described based on embodiments shown in the figures.

First Embodiment

Figure 1:
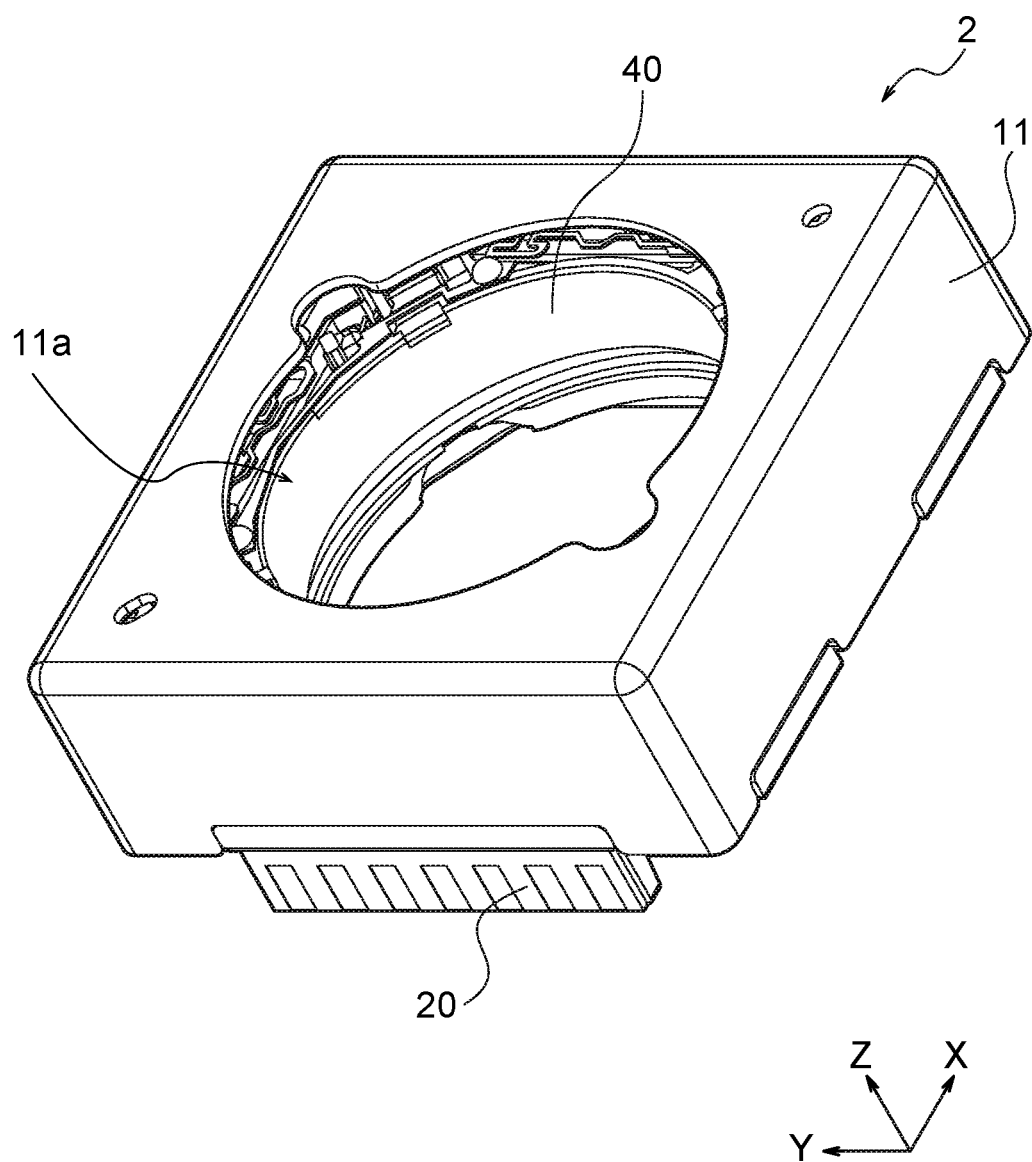
FIG. 1 is a whole perspective view of a lens drive device according to an embodiment of the present invention.

As shown in FIG. 1, a lens drive device 2 according to an embodiment of the present invention has an approximately rectangular-parallelepiped outer shape, and a case 11 attached from the positive side of the Z-axis direction constitutes an outer side surface of side surfaces and a top surface. A central area of the case 11 is provided with a through hole 11a where a light goes through inside the case 11. The light passing through the through hole 11a enters a lens 100 (see FIG. 6) held by a lens holder 40 inside the case 11. A part of a circuit board 20 is exposed from the case 11 on the lower side of side surfaces of the lens drive device 2. The case 11 is constituted by a non-magnetic metal such as aluminum, a non-magnetic alloy such as austenitic stainless, a non-magnetic material such as resin, or the like. Thus, the case 11 itself is not magnetized even if double-pole magnets mentioned below move relatively in the case 11.

Figure 2:
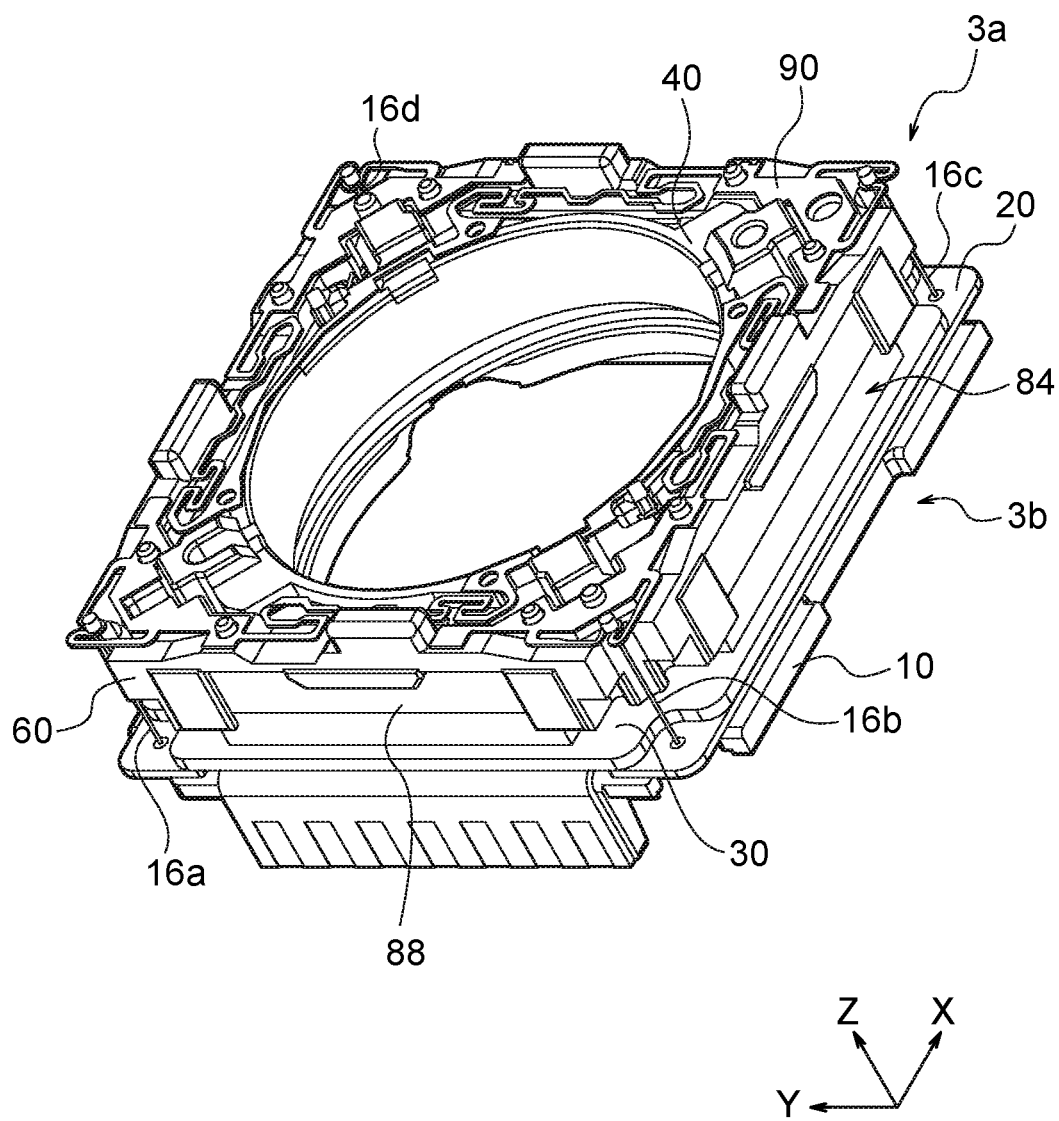
FIG. 2 is a whole perspective view showing the inside of the lens drive device with no case shown in FIG. 1.
Figure 3:
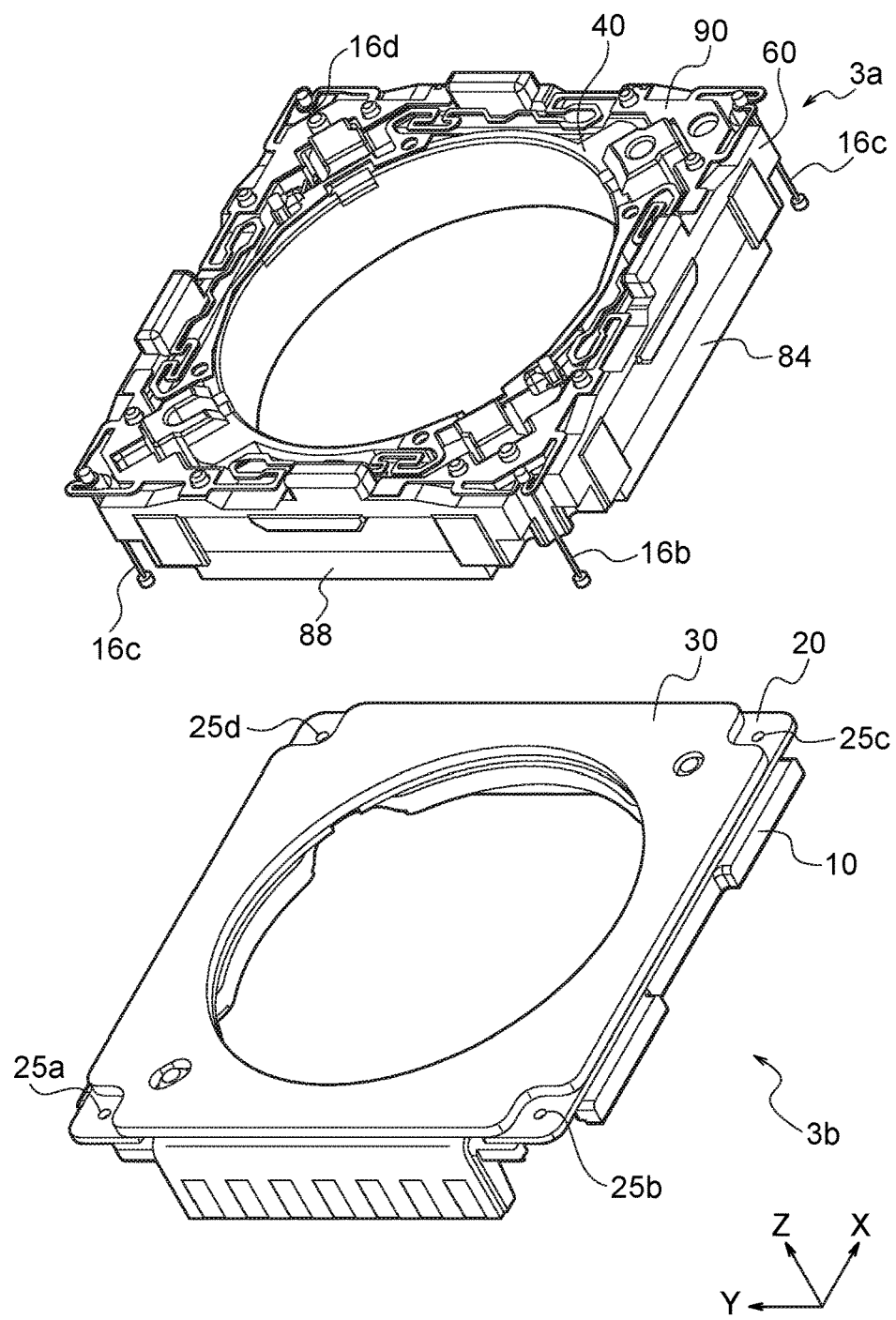
FIG. 3 is a partially disassembled perspective view showing disassembled movable portion and fixed portion of the lens drive device with no case shown in FIG. 2.

FIG. 2 is a whole perspective view showing the inside of the lens drive device 2 without the case 11 shown in FIG. 1. As shown in FIG. 2, the case 11 contains a movable portion 3a and a fixed portion 3b. As shown in FIG. 3, which shows that the movable portion 3a and the fixed portion 3b are disassembled, the lens drive device 2 has four suspension wires 16a, 16b, 16c, and 16d as support portions. The four suspension wires 16a, 16b, 16c, and 16d support the movable portion 3a so that the movable portion 3a is relatively movable to the fixed portion 3b in perpendicular directions to a light axis. Incidentally, the case 11 is attached to a base portion 10 of the fixed portion 3b so as to cover the movable portion 3a.

Figure 4:
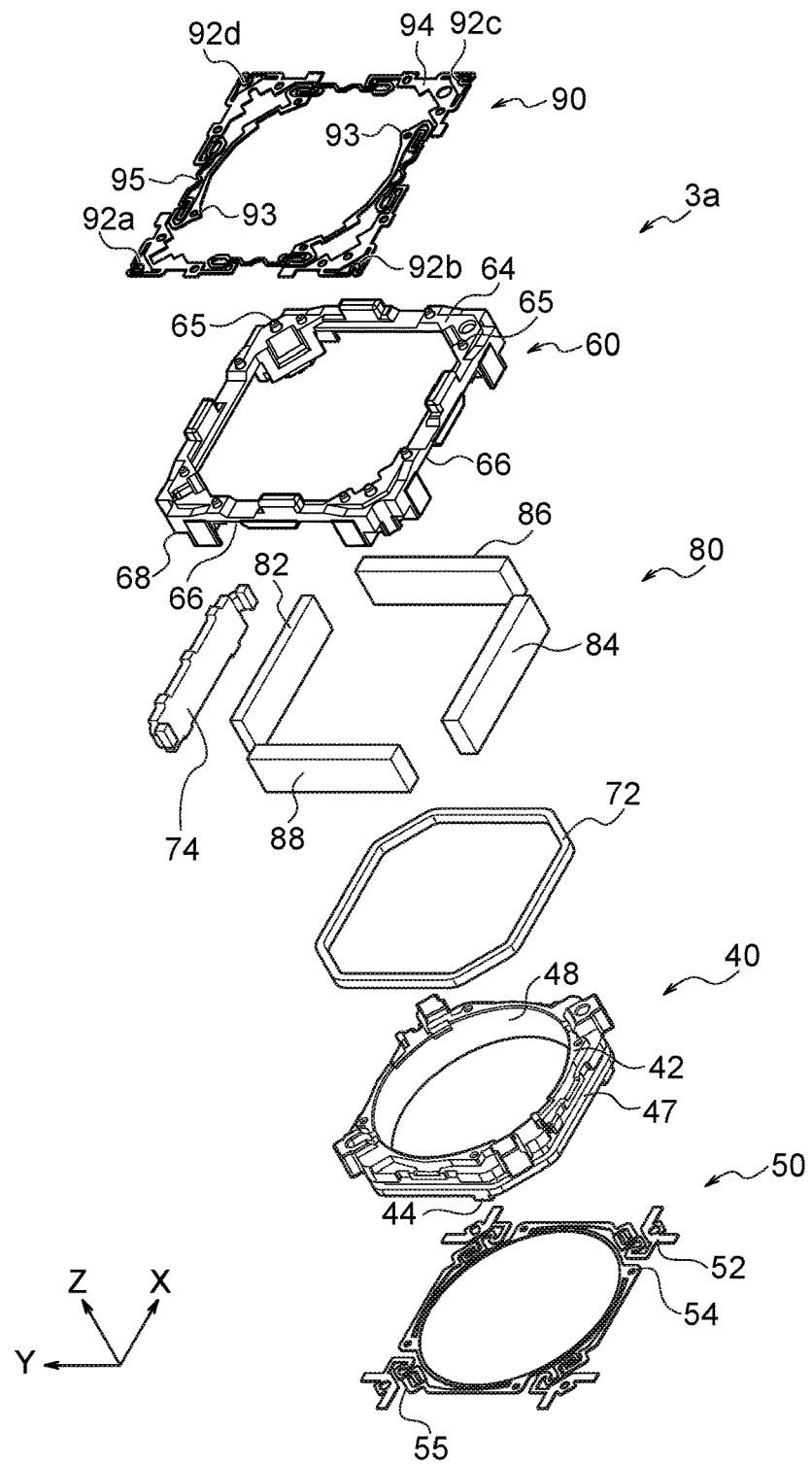
FIG. 4 is a disassembled perspective view of parts constituting the movable portion shown in FIG. 3.

FIG. 4 is a disassembled perspective view of the movable portion 3a shown in FIG. 3. The movable portion 3a has a two-way magnet 80 consisting of four magnets, a focus coil 72 as a first coil opposing to the two-way magnet 80 in a perpendicular direction to the light axis (X-axis or Y-axis direction), and a lens holder 40 holding the focus coil 72 and the lens 100 (see FIG. 6). The two-way magnet 80 of the movable portion 3a has four magnets of a first magnet 82, a second magnet 84, a third magnet 86, and a fourth magnet 88. The first to fourth magnets 82 to 88 are a double-pole magnet having two pairs of magnetic poles.

Figure 8:
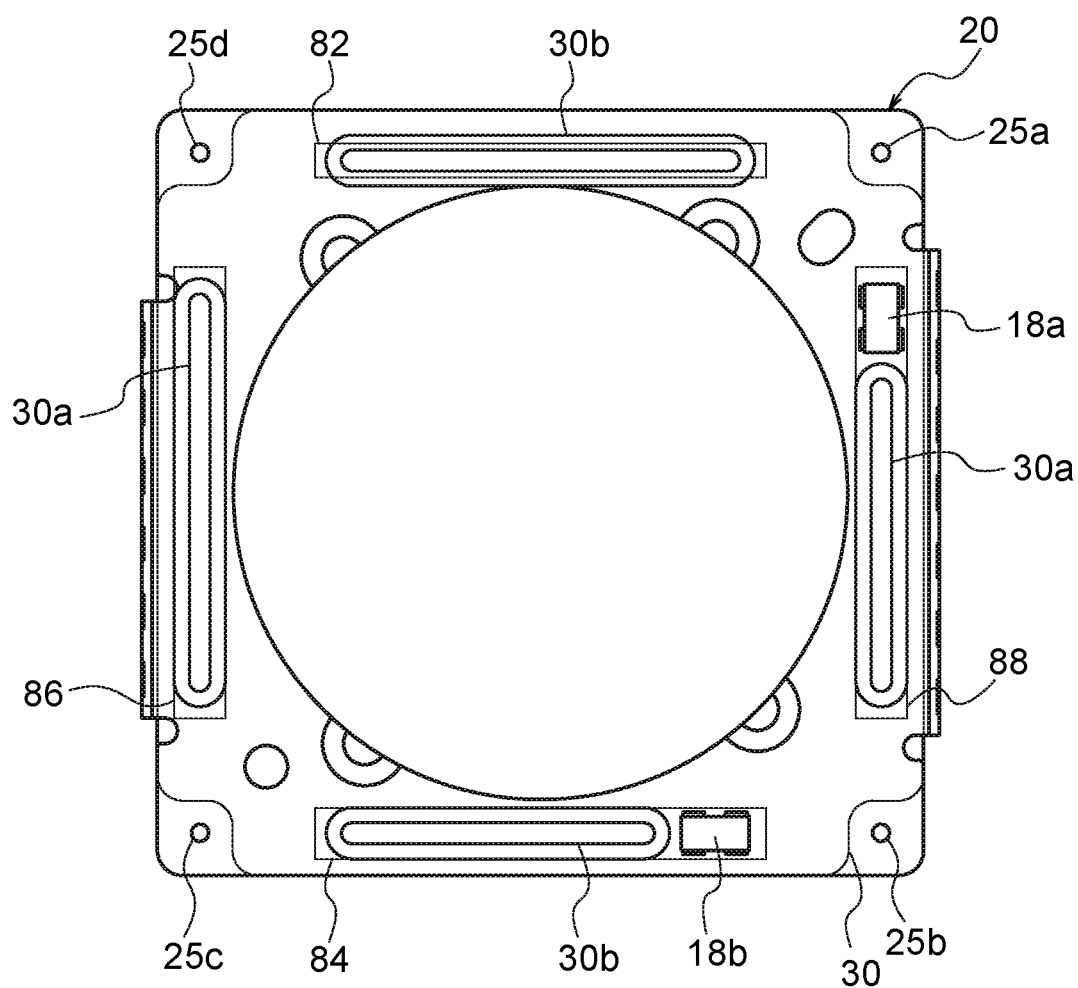
FIG. 8 is a conceptual view showing a positional relation of the double-pole magnets, the FP coil, the circuit board, and the position sensors shown in FIG. 7.

The two-way magnet 80 is arranged so as not to overlap with the lens 100 in the direction of the light axis (see FIG. 8). In addition to the lens holder 40 and the two-way magnet 80, the movable portion 3a has a front spring 90, a frame 60, the focus coil 72, and a rear spring 50.

Incidentally, the lens drive device 2 is described with a Z-axis, an X-axis, and a Y-axis. The Z-axis is a parallel direction to the light axis of the lens 100. The X-axis and the Y-axis are a perpendicular direction to the light axis. The X-axis, the Y-axis, and the Z-axis are perpendicular to each other. The X-axis corresponds with a first drive axis of blur correction, and the Y-axis corresponds with a second drive axis of blur correction. A front surface or a front side along the Z-axis represents an upward direction and represents an object side to the lens 100 in FIG. 6. A back surface or a back side along the Z-axis represents a downward direction and represents an imaging element side to the lens 100 in FIG. 6.

The lens holder 40 shown in FIG. 4 has an inner circumferential surface 48 having a circular shape in the light axis. An outer circumferential surface of the lens 100 not shown in FIG. 4 is attached to the inner circumferential surface 48 of the lens holder 40. As shown in FIG. 4, an outer circumferential surface 47 of the lens holder 40 has a polygonal outer circumferential shape contained inside the frame 60, and the focus coil 72 is attached to an outer circumferential groove formed on the outer circumferential surface 47 of the lens holder 40.

The lens holder 40 is attached to the frame 60 via the front spring 90 and the rear spring 50. The lens holder 40 and the lens 100 and the focus coil 72 fixed to the lens holder 40 are movable relatively to the frame 60 and the two-way magnet 80 fixed to the frame 60 in the direction of the light axis.

As shown in FIG. 4, the front spring 90 consists of a plurality of board-shaped divided plate springs that are mutually separated and insulated (two board-shaped divided plate springs in the present embodiment). The front spring 90 has wire attachment portions 92a to 92d attached to front tips of the suspension wires 16a to 16d. The four wire attachment portions 92a to 92d are arranged at four corners of the front spring 90.

Holder attachment portions 93 of the front spring 90 are attached and fixed to a front surface 42 of the lens holder 40. The front spring 90 has four frame attachment portions 94 corresponding and connected with each of the wire attachment portions 92a to 92d arranged at the four corners. The frame attachment portions 94 are attached and fixed to four corners positioned on a front surface 64 of the frame 60 having a rectangular ring shape.

The front surface 64 positioned at the corner of the frame 60 is preferably provided with a plurality of attachment convex portions 65. Each of the attachment convex portions 65 is engaged with an engagement hole formed on the frame attachment portions 94 of the front spring 90, and the front spring 90 is thereby positioned to the frame 60.

The front spring 90 has meandering portions 95. The meandering portion 95 connects the frame attachment portion 94 and the holder attachment portion 93. When the meandering portions 95 of the front spring 90 are deformed elastically, the lens holder 40 fixed with the holder attachment portions 93 is relatively movable toward the frame 60 and the two-way magnet 80 fixed to the frame 60 in the direction of the light axis.

Each of the suspension wires 16a to 16d and the front spring 90 is constituted by a conductive material, such as a metal, and is electrically conductive. Moreover, the suspension wires 16a and 16c are electrically connected with wirings of the circuit board 20, and the front spring 90 is electrically connected with the focus coil 72 fixed to the lens holder 40. Thus, electricity is supplied to the focus coil 72 via the circuit board 20, the suspension wires 16a and 16c, and the front spring 90.

As shown in FIG. 4, the frame 60 has a rectangular ring shape capable of containing the lens holder 40. The frame 60 itself is constituted by an insulation material, such as plastic. Magnet attachment concave portions 66 are formed along four sides of the frame 60 on the rear side in the Z-axis direction. The first to fourth magnets 82 to 88 constituting the two-way magnet 80 are fixed to the magnet attachment concave portions 66.

The first to fourth magnets 82 to 88 produce a magnetic field around the focus coil 72 fixed to the lens holder 40 and function as a magnet for focusing that moves the lens holder 40 in the direction of the light axis, and also produce a magnetic field around the FP coil 30 of the fixed portion 3b and function as a magnet for blur correction that moves the movable portion 3a in perpendicular directions to the light axis. Incidentally, the second magnet 84 and the fourth magnet 88 produce a magnetic field around the position sensors 18a and 18b and function as a magnet for position detection.

Figure 7:
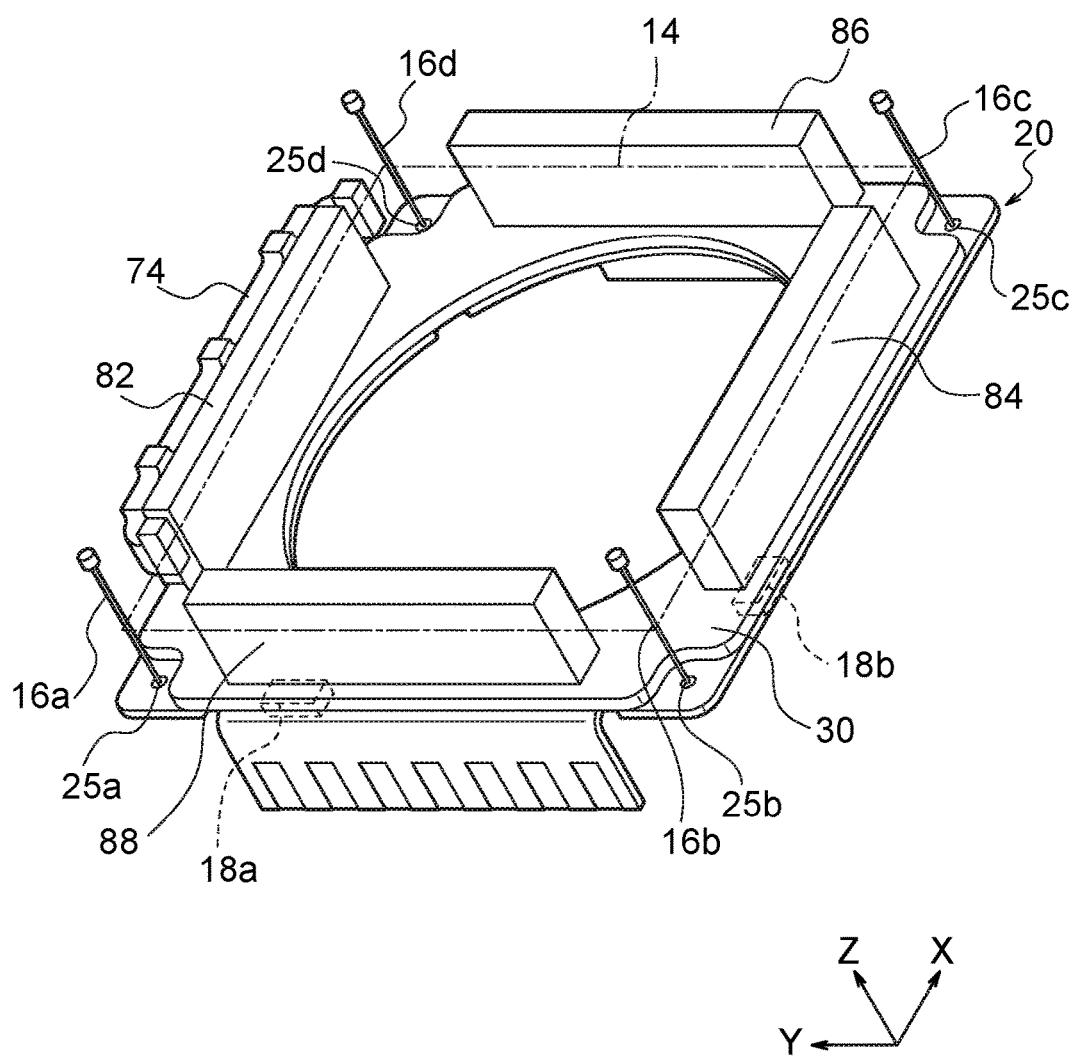
FIG. 7 is a perspective view showing an arrangement of suspension wires, double-pole magnets, a FP coil, a circuit board, a yoke, and position sensors of the lens drive device.

As shown in FIG. 7, the first to fourth magnets 82 to 88 have an approximately rectangular-parallelepiped outer shape and are respectively arranged along each side of a rectangle 14 surrounding the lens holder 40. The four first to fourth magnets 82 to 88 are arranged so that longer sides of the first to fourth magnets 82 to 88 are along each side of the rectangle 14. As shown in FIG. 3 and FIG. 4, each of the first to fourth magnets 82 to 88 is arranged on the respective sides of the frame 60.

That is, the first magnet 82 and the second magnet 84 are arranged in parallel to each other so that their longer sides are parallel to the X-axis. The first magnet 82 and the second magnet 84 are fixed along a pair of sides of the four sides of the frame 60 parallel to the X-axis. The third magnet 86 and the fourth magnet 88 are arranged in parallel to each other so that their longer sides are parallel to the Y-axis. The third magnet 86 and the fourth magnet 88 are fixed along a pair of sides of the four sides of the frame 60 parallel to the Y-axis.

Figure 6:
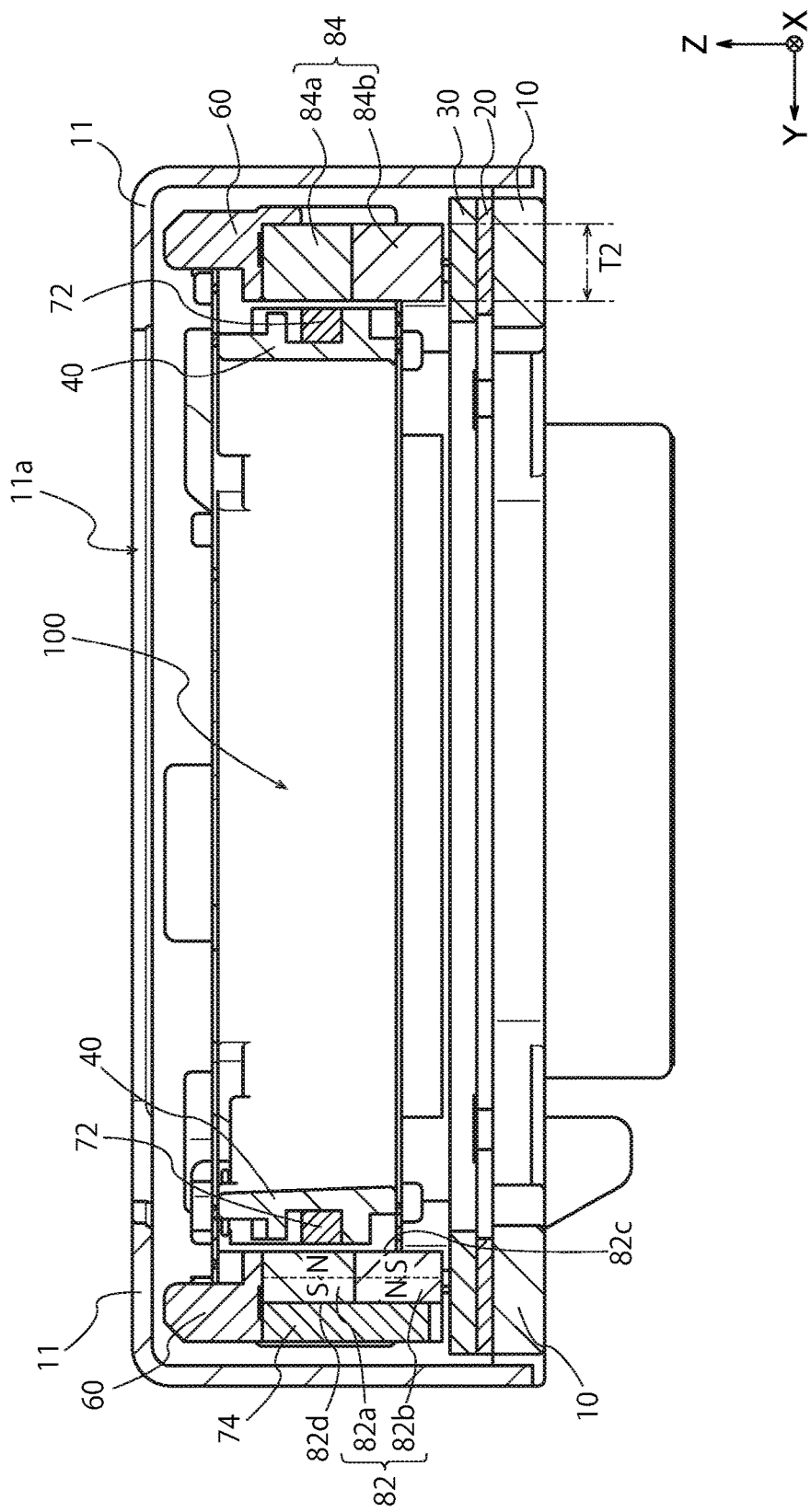
FIG. 6 is a cross-sectional view of the lens drive device shown in FIG. 1.

The first to fourth magnets 82 to 88 are arranged to surround the lens holder 40 as shown in FIG. 2 and FIG. 3, and are arranged so as not to overlap with the lens 100 held by the lens holder 40 in the direction of the light axis as understood from FIG. 6, which is a cross-sectional view. Incidentally, the first to fourth magnets are described in detail below.

As shown in FIG. 4 and FIG. 7, the movable portion 3a has a yoke 74. As shown in FIG. 6, which is a cross-sectional view, the yoke 74 is arranged on an outer side surface 82d opposite to an inner side surface 82c facing the focus coil 72 as a first coil. The yoke 74 is attached so as not to move relatively to the first magnet 82. The yoke 74 may be fixed to the first magnet 82 or may be fixed to the frame 60 along with the first magnet 82. The yoke 74 is constituted by a soft magnetic material, such as iron, or a material containing the soft magnetic material.

As shown in FIG. 4, the rear spring 50 is constituted by a plate spring continuing in the circumferential direction and has holder attachment portions 54 with a ring shape. The holder attachment portions 54 are fixed to plate spring attachment portions 44 arranged in a back surface 45 of the lens holder 40. The rear spring 50 is fixed to the plate spring attachment portions 44 by any means, such as engagement and adhesive.

The rear spring 50 has four frame attachment portions 52. The frame attachment portions 52 are arranged at the four corners of the rear spring 50 on the outer circumferential side of the holder attachment portions 54. The holder attachment portion 54 and the frame attachment portion 52 are connected by a meandering portion 55 corresponding with each of the frame attachment portions 52. Each of the frame attachment portions 52 is engaged and fixed with a corner back surface 68 of the frame 60.

When the meandering portions 55 of the rear spring 50 are elastically deformed in a similar manner to the meandering portions 95 of the front spring 90, the lens holder 40 fixed with the holder attachment portions 54 can move relatively to the frame 60 and the two-way magnet 80 fixed to the frame 60 in the direction of the light axis. Unlike the front spring 90, however, the rear spring 50 does not need to function as an electrically conductive passage.

FIG. 6 is a cross-sectional view of the lens drive device 2. As shown in FIG. 6, the first and second magnets 82 and 84 attached to the frame 60 are opposed to the focus coil 72 fixed to the outer circumferential surface 47 of the lens holder 40 with a slight space. The first and second magnets 82 and 84 generate a magnetic field around the focus coil 72 adjacent to their inner side. Although FIG. 6 fails to show, the third and fourth magnets 86 and 88 shown in FIG. 7 are also opposed to the focus coil 72 with a slight space and generate a magnetic field around the focus coil 72 in a similar manner to the first and second magnets 82 and 84 shown in FIG. 6. The lens drive device 2 adjusts a direction and an amount of an electric current flowing through the focus coil 72 and controls a force to the focus coil 72 generated by its near magnetic field, and the lens 100 fixed to the lens holder 40 can thereby move along the direction of the light axis.

Figure 5:
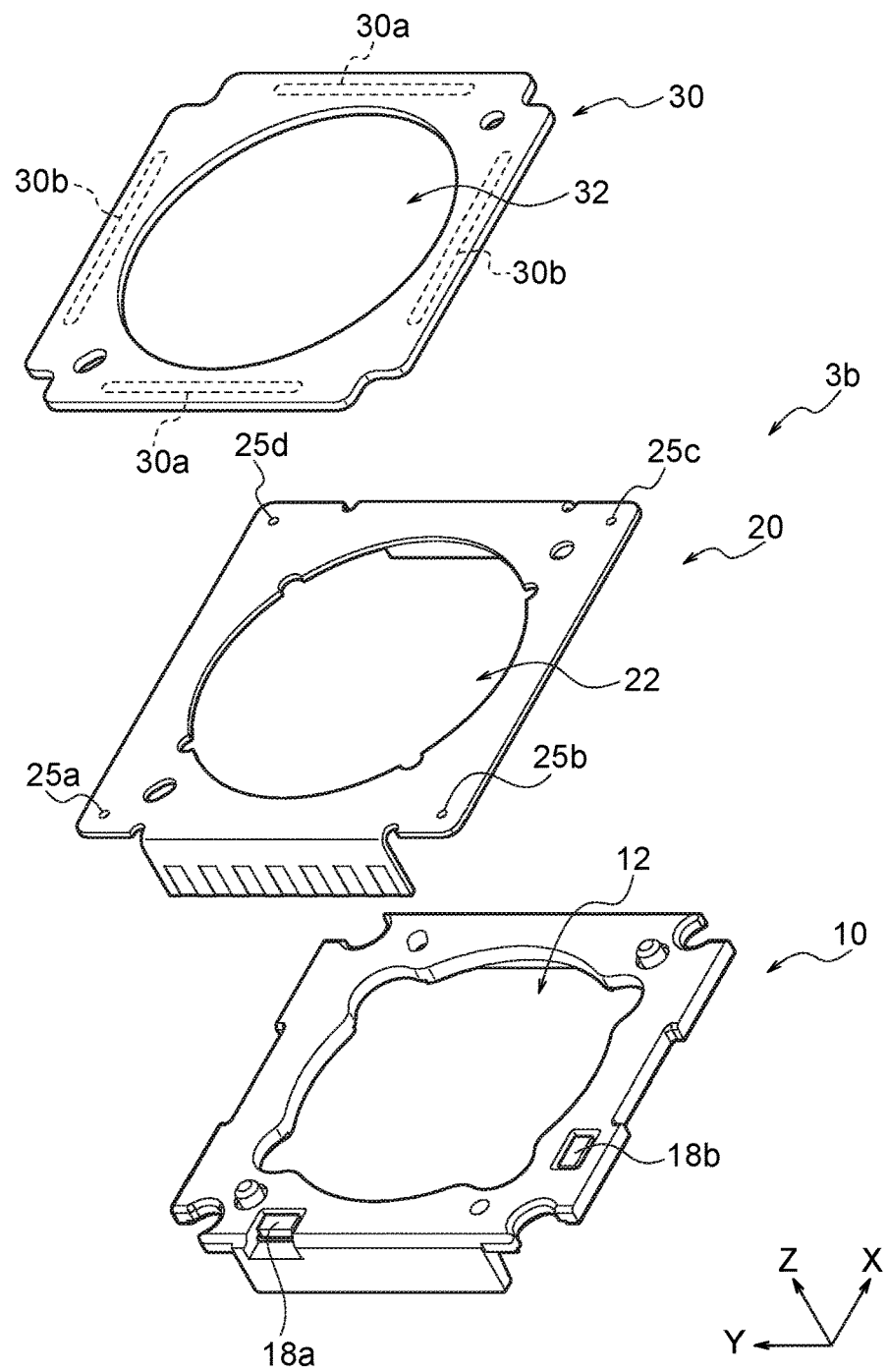
FIG. 5 is a disassembled perspective view of parts constituting the fixed portion shown in FIG. 3.

FIG. 5 is a disassembled perspective view of the fixed portion 3b shown in FIG. 3. The fixed portion 3b has the FP coil 30 as a second coil, the circuit board 20, the base portion 10, and the position sensors 18a and 18b. The FP coil 30 has a rectangular plate shape whose central area is provided with a FP coil opening 32 of a circular through hole. The surface of the FP coil 30 is covered with an insulator such as a resin. The insulator covering the surface of the FP coil 30 contains the drive coils 30a and 30b, where a conductor foil is formed into a coil shape.

As shown by the dotted lines in FIG. 5, the FP coil 30 has four drive coils 30a and 30b consisting of the two drive coils 30a extending in the Y-axis direction and the two drive coils 30b extending in the X-axis direction. Each of the four drive coils 30a and 30b is arranged along respective sides of a board plane portion of the circuit board 20 below so as to surround outer circumferences of the FP coil opening 32 and a board opening 22 of the circuit board 20 in the direction of the light axis.

A pair of the drive coils 30a, whose longer sides are parallel to the Y-axis, is arranged along a pair of sides parallel to the Y-axis of the four sides of the board plane portion with a rectangular outer circumference. A pair of the drive coils 30b, whose longer sides are parallel to the X-axis, is arranged along a pair of sides parallel to the X-axis of the four sides of the board plane portion.

As shown in FIG. 3 to FIG. 5, each of the drive coils 30a and 30b owned by the FP coil 30 is arranged to oppose against the first to fourth magnets 82 to 88 fixed to the frame 60 in the direction of the light axis. The drive coils 30a shown in FIG. 5 are arranged to oppose against the third and fourth magnets 86 and 88 shown in FIG. 4, and the drive coils 30b shown in FIG. 5 are arranged to oppose against the first and second magnets 82 and 84. The drive coils 30a and the third and fourth magnets 86 and 88, whose longer sides are parallel to the Y-axis, constitute a drive portion for blur correction where the movable portion 3a is moved toward the X-axis direction. The drive coils 30b and the first and second magnets 82 and 84, whose longer sides are parallel to the X-axis, constitute a drive portion for blur correction where the movable portion 3a is moved toward the Y-axis direction.

Each of the drive coils 30a and 30b owned by the FP coil 30 is electrically connected with the wirings of the circuit board 20 arranged behind and is supplied with electricity via the wirings of the circuit board 20. Incidentally, in the present embodiment, the drive coils 30a and 30b are constituted by the FP coil 30, but the second coil is not limited to the FP coil 30 and may be a coil formed by winding a coated wire.

As shown in FIG. 5, the board opening portion 22, which goes through front and back surfaces, is formed in the central area of the circuit board 20. The circuit board 20 is constituted by a flexible print board. In the circuit board 20, the insulator composed of a resin contains a plurality of the wirings of conductive foils. Four wire connection positions 25a to 25d are formed at the four corners of the circuit board 20. Rear ends of the suspension wires 16a to 16d are connected with the respective wire connection positions 25a to 25d.

A base opening 12 is formed in the central area of the base portion 10. The base portion 10 has a similar outer shape to the circuit board 20 and is constituted by a resin molded body or so. The circuit board 20 constituted by a flexible print board is attached from the positive side of the Z-axis direction to the base portion 10 and is thereby supported by the base portion 10 from behind.

A through hole is formed at two points of the base portion 10 so that the position sensors 18a and 18b can be attached to the circuit board 20. The position sensors 18a and 18b are fixed to the rear surface of the circuit board 20 (the surface facing the negative side of the Z-axis direction) and are contained in the through holes of the base portion 10. As shown in FIG. 8, the position sensor 18a is arranged so as to oppose to the fourth magnet 88, whose longer sides are parallel to the Y-axis, in the direction of the light axis, and the position sensor 18b is arranged so as to oppose to the second magnet 84, whose longer sides are parallel to the X-axis, in the direction of the light axis.

The position sensor 18a detects a position of the movable portion 3a with respect to the direction of the X-axis direction, and the position sensor 18b detects a position of the movable portion 3a with respect to the Y-axis direction.

The position sensors 18a and 18b are electrically connected with the wirings of the circuit board 20, and each of the position sensors 18a and 18b is supplied with electricity via the wirings of the circuit board 20. Detection signals of the position sensors 18a and 18b are also transmitted via the wirings of the circuit board 20.

As shown in FIG. 2 and FIG. 3, the movable portion 3a is supported by the four suspension wires 16a, 16b, 16c, and 16d with respect to the fixed portion 3b. As shown in FIG. 7, the rear ends of the suspension wires 16a to 16d are connected with the wire connection positions 25a to 25d positioned at the four corners of the circuit board 20, and are connected with the wire attachment portions 92a to 92d positioned at the four corners of the front spring 90.

In this way, the suspension wires 16a to 16d are arranged at approximately equal intervals around the lens holder 40 and the lens 100 held by the lens holder 40 in the direction of the light axis, and each of the suspension wires 16a to 16d connects the movable portion 3a and the fixed portion 3b in the direction of the light axis.

The four suspension wires 16a to 16d have a similar length and support the movable portion 3a in an approximately parallel state to the fixed portion 3b. When the four suspension wires 16a to 16d are deformed elastically in a cooperative manner, the movable portion 3a can move relatively to the fixed portion 3b along a drive plane perpendicular to the light axis. As shown in FIG. 2 and FIG. 3, the movable portion 3a moves relatively to the fixed portion 3b connected by the suspension wires 16a to 16d in perpendicular directions to the light axis by an electromagnetic force generated in the first to fourth magnets 82 to 88 and the drive coils 30a and 30b.

FIG. 8 shows an arrangement relation of the first to fourth magnets 82 to 88, the FP coil 30, the circuit board 20, and the position sensors 18a and 18b shown in FIG. 7, and is a conceptual view showing an arrangement of each member in the direction of the light axis. Incidentally, FIG. 8 does not indicate the base portion 10 arranged behind the circuit board 20.

As shown in FIG. 8, when viewed in the direction of the light axis, the position sensors 18a and 18b and the drive coils 30a and 30b are arranged to overlap with sides of a tetragon formed by linking the four wire connection positions 25a to 25d, where the four suspension wires 16a to 16d are connected with the circuit board 20 (included in the fixed portion 3b). That is, when viewed in the direction of the light axis, the position sensor 18a and the drive coil 30a opposing to the fourth magnet 88 are arranged to overlap with a side linking the wire connection position 25a and the wire connection position 25b. Likewise, when viewed in the direction of the light axis, the position sensor 18b and the drive coil 30b opposing to the second magnet 84 are arranged to overlap with a side linking the wire connection position 25b and the wire connection position 25c. Incidentally, for improvement in sensitivity or so, the drive coils 30a and 30b and the position sensors 18a and 18b may be arranged so as to overlap with each other in the direction of the light axis.

As shown in FIG. 6, which is a cross-sectional view, the first magnet 82 and the second magnet 84 are a double-pole magnet having two pairs of magnetic poles. The first magnet 82 has a first section 82a and a second section 82b (see FIG. 9). The first section 82a has a first magnetization direction and opposes to the focus coil 72. The second section 82b has a second magnetization direction different from the first magnetization direction and opposes to the drive coil 30b of the FP coil 30.

In the first section 82a of the first magnet 82, as shown in FIG. 6, the inner side surface 82c is N-pole and the outer side surface 82d is S-pole, and the first magnetization direction, which is a magnetization direction of the first section 82a, is a negative direction of the Y-axis. On the other hand, in the second section 82b of the first magnet 82, the inner side surface 82c is S-pole and the outer side surface 82d is N-pole, and the second magnetization direction, which is a magnetization direction of the second section 82b, is a positive direction of the Y-axis, which is opposite to the first magnetization direction. The first section 82a is formed on the positive side of the Z-axis direction in the first magnet 82, and the second section 82b is formed on the negative side of the Z-axis direction in the first magnet 82. The first magnet 82 is a double-pole magnet having two pairs of magnetic poles (S-pole and N-pole).

Figure 9:
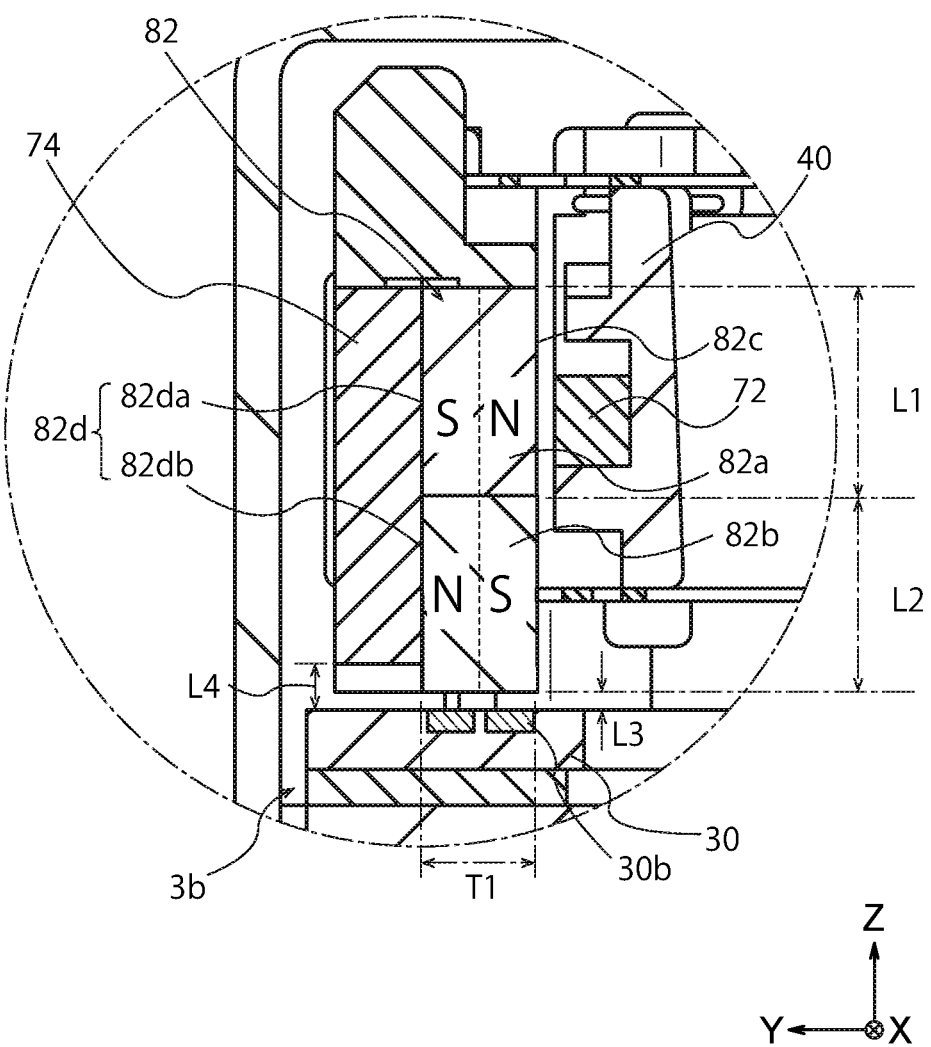
FIG. 9 is a conceptual view showing an arrangement of the double-pole magnets, the yoke, a first coil, and a second coil in the cross sectional view of FIG. 6.

FIG. 9 is a conceptual view showing an arrangement of the first magnet 82, the yoke 74, the focus coil 72, and the FP coil 30 in the cross sectional view of FIG. 6. In the first magnet 82, as shown in FIG. 9, L1/L2 is 0.9 to 1.1, where L1 is a length of the first section 82a in the direction of the light axis, and L2 is a length of the second section 82b in the direction of the light axis.

The yoke 74 covers the whole of a first outer side surface 82da in the first section 82a of the outer side surface 82d of the first magnet 82, and covers a part of a second outer side surface 82db in the second section 82b of the outer side surface 82d of the first magnet 82. The lower end of the second section 82b protrudes toward the FP coil 30 more than the lower end of the yoke 74. Thus, a distance L4 between the yoke 74 and the FP coil 30 constituting the upper surface of the fixed portion 3b is larger than a distance L3 between the first magnet 82 and the FP coil 30 constituting the upper surface of the fixed portion 3b. Incidentally, the first magnet 82 is a double-pole magnet where the first outer side surface 82da is S-pole and the second outer side surface 82db is N-pole, but may be a double-pole magnet where the first outer side surface 82da is N-pole and the second outer side surface 82db is S-pole.

As shown in FIG. 6, the second magnet 84 arranged in parallel to the first magnet 82 has a first section 84a and a second section 84b in a similar manner to the first magnet 82. The first section 84a has a first magnetization direction and opposes to the focus coil 72. The second section 84b has a second magnetization direction different from the first magnetization direction and opposes to the FP coil 30. However, the first magnet 82 of the four magnets owned by the movable portion 3a is different from the second magnet 84, which is another magnet arranged in parallel to the first magnet 82, in a thickness that is a length in the Y-axis direction, which is vertical to the longitudinal direction and is a perpendicular direction to the light axis.

That is, a thickness T1 of the first magnet 82 shown in FIG. 9 is smaller than a thickness T2 of the second magnet 84 shown in FIG. 6. The yoke 74 is provided on the outer side surface 82d of the first magnet 82 having a relatively small thickness in the first magnet 82 and the second magnet 84, and no yoke is provided on the outer side surface of the second magnet 84 having a relatively large thickness in the first magnet 82 and the second magnet 84. In the embodiment shown in FIG. 6, a sum of a thickness T1 of the first magnet 82 and a thickness of the yoke 74 is approximately equal to a thickness T2 of the second magnet 84, but the first and second magnets 82 and 84 and the yoke 74 have any thickness.

Incidentally, the third and fourth magnets 86 and 88 shown in FIG. 7 are similar to the second magnet 84 shown in FIG. 6 except for arrangement direction, and a detailed structure of the third and fourth magnets 86 and 88 is thereby not described.

As described above, the lens drive device 2 according to the present embodiment produces a magnetic field for driving the lens around the focus coil 72 and the FP coil 30 using the first to fourth magnets 82 to 88, which are a double-pole magnet. In the lens drive device 2, since the double-pole magnets are used as magnets for generating a magnetic field, a formation range of magnetic field can concentrate around the focus coil 72 and the FP coil 30, and magnetic flux can be prevented from leaking toward the outside of the lens drive device 2, compared to when using a normal magnet having a pair of N-pole and S-pole. Thus, the lens drive device 2 with the double-pole magnets can prevent magnetic interference with other devices and can be mounted densely on mobile communication terminal or so.

Moreover, as shown in FIG. 9, since L1/L2, which is a ratio of a length L1 of the first section 82a to a length L2 of the second section 82b in the first magnet 82, is 0.9 to 1.1 and a length L1 of the first section 82a and a length L2 of the second section 82b are approximately equal to each other, the lens drive device 2 can more effectively prevent magnetic flux from leaking toward the outside. Since the yoke 74 is provided on the outer side surface 82d of the first magnet 82, magnetic flux of the first magnet 82 can effectively concentrate around the focus coil 72 and the FP coil 30, and magnetic flux can be prevented from leaking toward the outside of the lens drive device 2.

In the lens drive device 2, as shown in FIG. 9, the yoke 74 covers the whole of the first outer side surface 82da, and magnetic flux can be thereby prevented effectively from leaking toward the outside of the lens drive device 2. Since the yoke 74 covers a part of the second outer side surface 82db and a distance L4 between the yoke 74 and the fixed portion 3b is larger than a distance L3 between the first magnet 82 and the fixed portion 3b, a distance between the first magnet 82 and the drive coil 30b can be reduced while magnetic flux is prevented from leaking toward the outside of the lens drive device 2 and a gap between the movable portion 3a and the fixed portion 3b is maintained appropriately.

In the lens drive device 2, as shown in FIG. 6, a thickness T1 of the first magnet 82 is smaller than a thickness T2 of the second magnet 84, and magnetic flux can be thereby prevented from leaking toward the positive side of the Y-axis direction, where the first magnet 82 having a relatively small thickness is arranged. Thus, in the lens drive device 2, other electromagnetic devices, such as another lens drive device, can be arranged on the positive side of the Y-axis direction, where magnetic flux leaks less, and a more effective high-density mounting can be achieved. A side where magnetic flux leaks relatively more can be directed toward a periphery of a mount board where the lens drive device 2 is mounted, or can be provided with a device that is hardly affected by magnetic flux leakage.

Moreover, the yoke 74 is provided on the outer side surface 82d of the first magnet 82 having a relatively small thickness, and magnetic flux is thereby prevented from leaking toward the positive side of the Y-axis direction, where the first magnet 82 is arranged. In the lens drive device 2, the yoke 74 is arranged in a space caused by decreasing a thickness of the first magnet 82, and it is thereby possible to achieve both prevention of magnetic flux leakage and downsizing and to reduce or overcome a weight imbalance caused by reducing a thickness of the magnet by arranging the yoke 74.

Since the case 11 is nonmagnetic, the lens drive device 2 does not have a problem of magnetization of the case 11 based on positional change of the two-way magnet 80 or a problem of adverse effect on movement of the two-way magnet 80 due to magnetization of the case 11. Thus, the lens drive device 2 can reduce a space between the case 11 and the movable portion 3a and can be downsized, compared to conventional lens drive devices.

Second Embodiment

Figure 10:
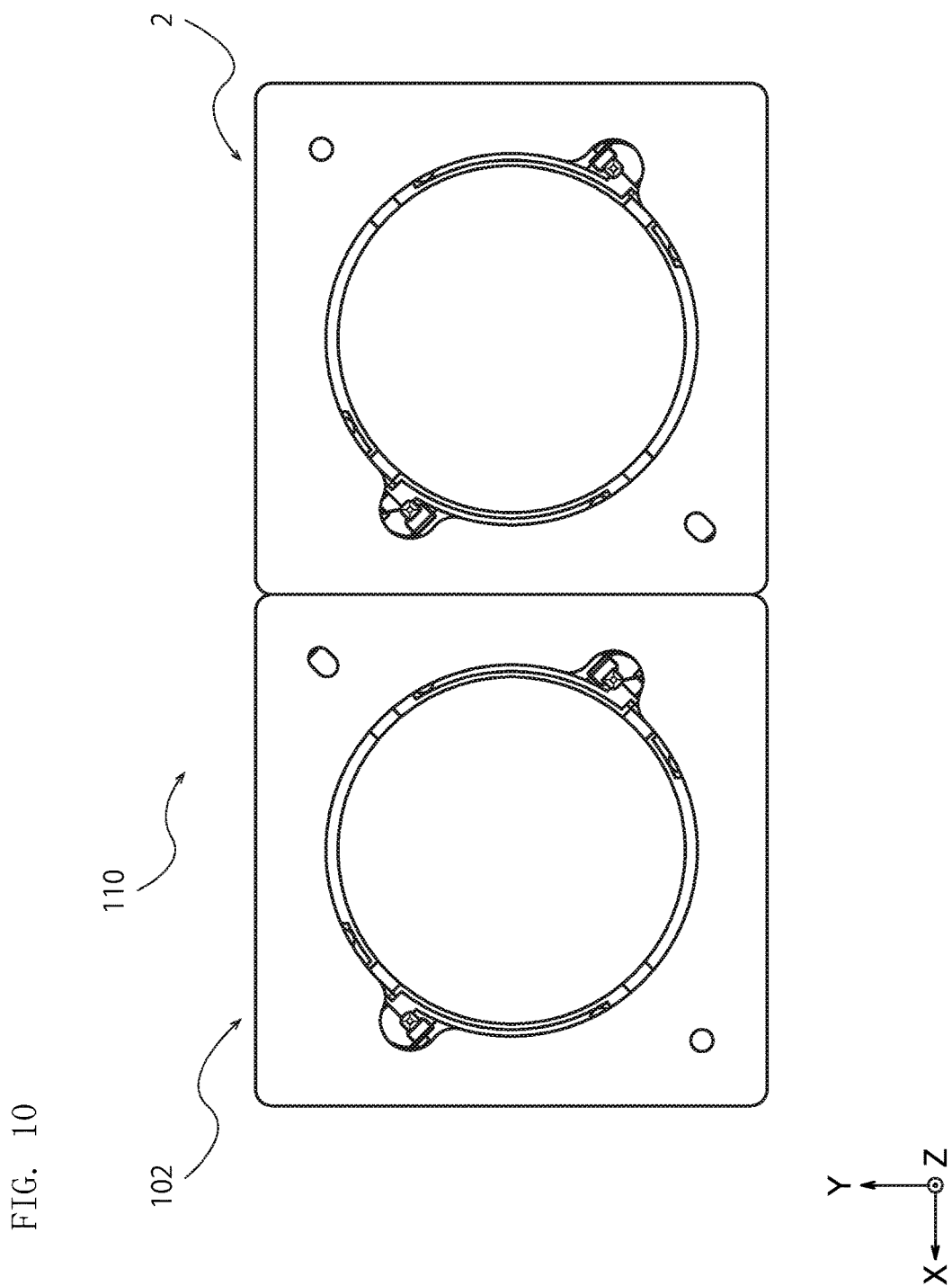
FIG. 10 is a schematic view showing an electromagnetic drive unit according to Second Embodiment of the present invention.

FIG. 10 is an external view showing an electromagnetic drive unit 110 according to Second Embodiment of the present invention. The electromagnetic drive unit 110 has a lens drive device 2 according to First Embodiment and another lens drive device 102 as an electromagnetic drive device. The lens drive device 102 is similar to the lens drive device 2 except for arrangement and posture to the coordinates. The lens drive device 102 has first to fourth magnets 182 to 188 (see FIG. 11) corresponding to the first to fourth magnets 82 to 88 of the lens drive device 2 and an external coil corresponding to the focus coil 72 and the FP coil 30 of the lens drive device 2. The external coil and the first to fourth magnets 182 to 188, which are external magnets, of the lens drive device 102 move relatively by electromagnetic drive force in a similar manner to the lens drive device 2.

As shown in FIG. 10, the lens drive device 2 and the lens drive device 102 are arranged in the X-axis direction, and the lens drive device 102 is arranged adjacently to the lens drive device 2 on the positive side of the X-axis direction with a predetermined space to the lens drive device 2.

Figure 11:
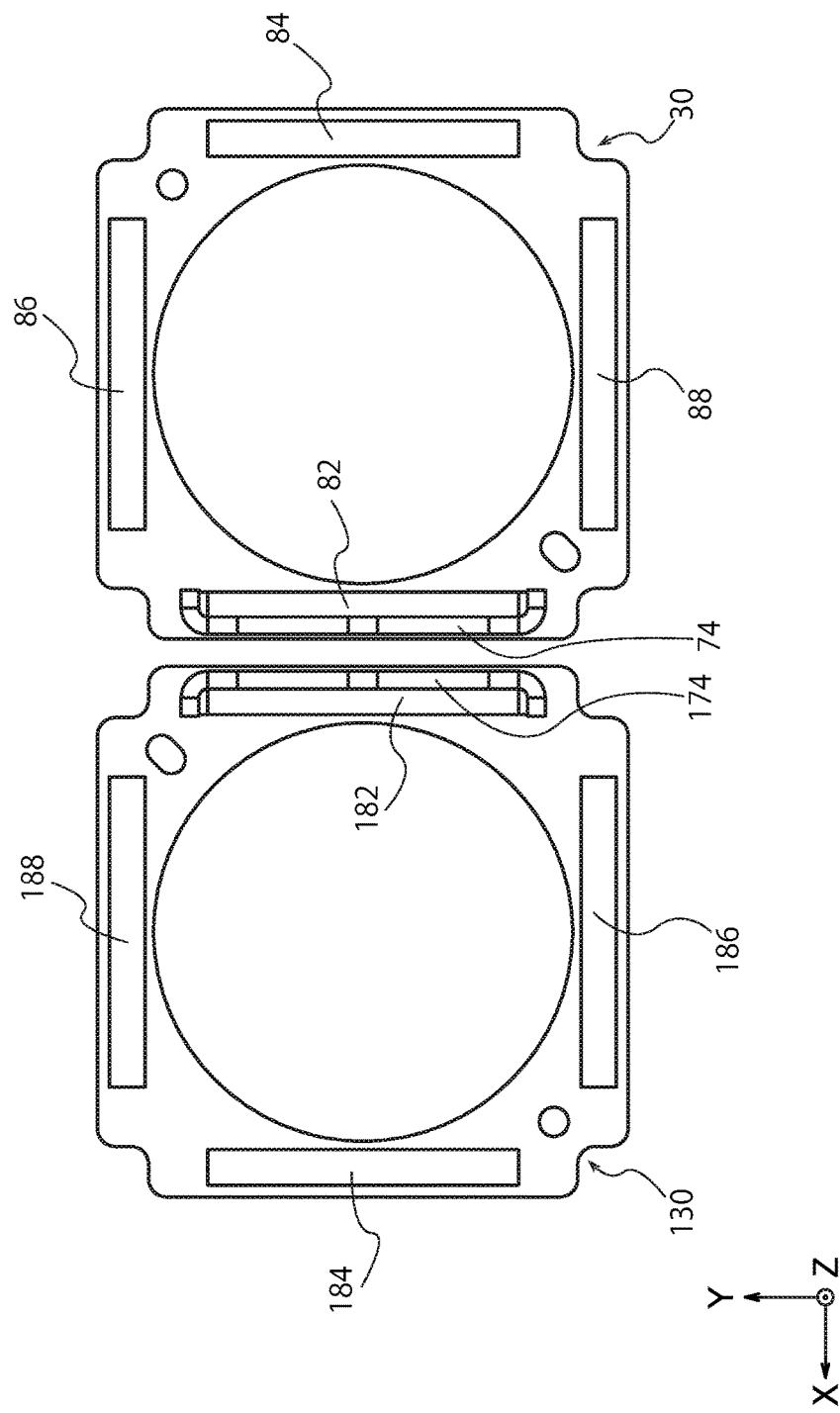
FIG. 11 is a conceptual view showing an arrangement of double-pole magnets and yokes included in the electromagnetic unit shown in FIG. 10.

FIG. 11 illustrates only the first to fourth magnets 82 to 88, the FP coil 30, and the yoke 74 of the lens drive device 2 and the first to fourth magnets 182 to 188, a FP coil 130, and a yoke 174 of the lens drive device 102 among members constituting the electromagnetic drive unit 110 shown in FIG. 10. As shown in FIG. 11, the lens drive device 102 is arranged in a posture where the lens drive device 2 is rotated at 180 degrees while the direction of the light axis is maintained.

The two lens drive devices 2 and 102 are arranged so that the first magnets 82 and 182 with the yokes 74 and 174 are adjacent to each other. As described in First Embodiment, the first magnets 82 and 182 are a double-pole magnet and thinner than the other magnets 84, 86, 88, 184, 186, and 188, and have the yokes 74 and 174 arranged on the outer side surfaces. Thus, the first magnet 82 of the lens drive device 2 is prevented from giving magnetic effects on the focus coil and the FP coil of the lens drive device 102 adjacent to each other, and a magnetic interference between the first magnet 82 of the lens drive device 2 and the first magnet 182 of the lens drive device 102 is prevented effectively.

A magnetic force received by the focus coil and the FP coil of the lens drive device 102 from the first to fourth magnets 82 to 88 of the lens drive device 2 adjacent to each other is smaller than a magnetic force received by the focus coil and the FP coil of the lens drive device 102 from the first to fourth magnets 182 to 188 of the lens drive device 102, and the lens drive device 102 can favorably drive a lens (external lens) held by a lens holder of a movable portion in an independent manner from a lens of the lens drive device 2 adjacent to each other. Since a magnetic interference between the lens drive device 2 and the lens drive device 102 is small, a predetermined distance between the lens drive device 2 and the lens drive device 102 can be reduced, and the lens drive device 2 and the lens drive device 102 can constitute a compact and high-performance dual lens drive device.

Other Embodiments

Figure 12:
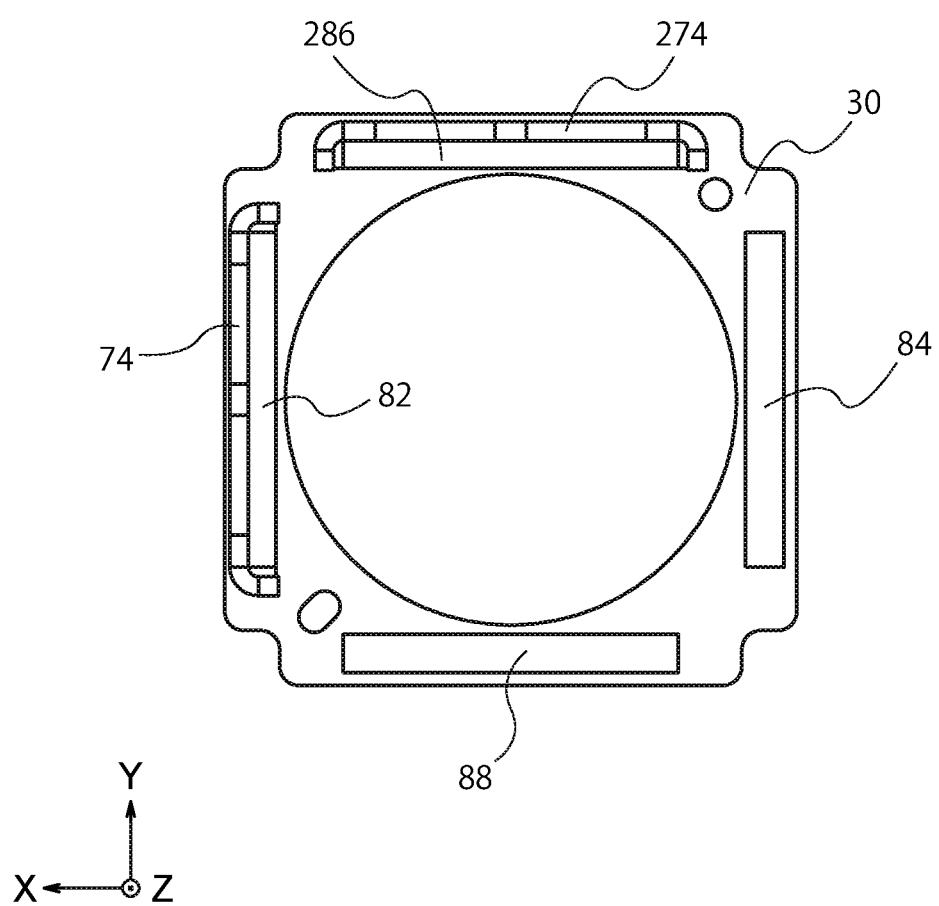
FIG. 12 is a conceptual view showing an arrangement of double-pole magnets and yokes included in an electromagnetic unit according to a variation.

The present invention is described with reference to the embodiments, but is not limited to only the embodiments. Needless to say, other various embodiments are included within the technical scope of the present invention. For example, the lens drive device 2 uses the suspension wires 16a to 16d as support portions, but support portions that support the movable portion 3a are not limited to the suspension wires 16a to 16d and may be portions having another structure, such as rolling ball and guide shaft. In addition, for example, the movable portion 3a of the lens drive device 2 has one yoke 74 as shown in FIG. 4, but the movable portion may have two to four yokes. FIG. 12 is a schematic view showing a first magnet 82, a second magnet 84, a third magnet 286, a fourth magnet 88, a FP coil 30, and yokes 74 and 274 of a lens drive device according to a variation.

As shown in FIG. 12, the lens drive device according to this variation is different from the lens drive device 2 according to First Embodiment in that the third magnet 286 has a thickness that is identical to a thickness of the first magnet 82, and that the yoke 274 similar to the yoke 74 arranged on the outer side surface of the first magnet 82 is provided on the outer side surface of the third magnet 286, but the lens drive device according to this variation is similar to the lens drive device 2 according to First Embodiment with respect to the other matters.

As shown in FIG. 12, the lens drive device according to this variation has two yokes 74 and 274, and the two yokes 74 and 274 are arranged correspondingly to the first and third magnets 82 and 286 of the four magnets, which are two magnets arranged vertically to each other. In such a lens drive device, magnetic flux is prevented from leaking toward the positive side of the Y-axis direction and the positive side of the X-axis direction, and a more effective high-density mounting can be thereby achieved by arranging other devices that should not be affected by external magnetic field, such as antenna, speaker, and microphone, on the positive side of the Y-axis direction and the positive side of the X-axis direction of the lens drive device.

In the lens drive device according to this variation, a yoke is arranged on one of the magnets arranged opposite to each other and no yoke is arranged on the other magnet in both of the X-axis direction and the Y-axis direction among perpendicular directions to the light axis, which are drive directions of blur correction. In such a lens drive device, a rotational symmetry relation is satisfied between a drive portion in the X-axis direction and a drive portion in the Y-axis direction, and a drive force in the X-axis direction and a drive force in the Y-axis direction can be aligned easily.

Figure 13:
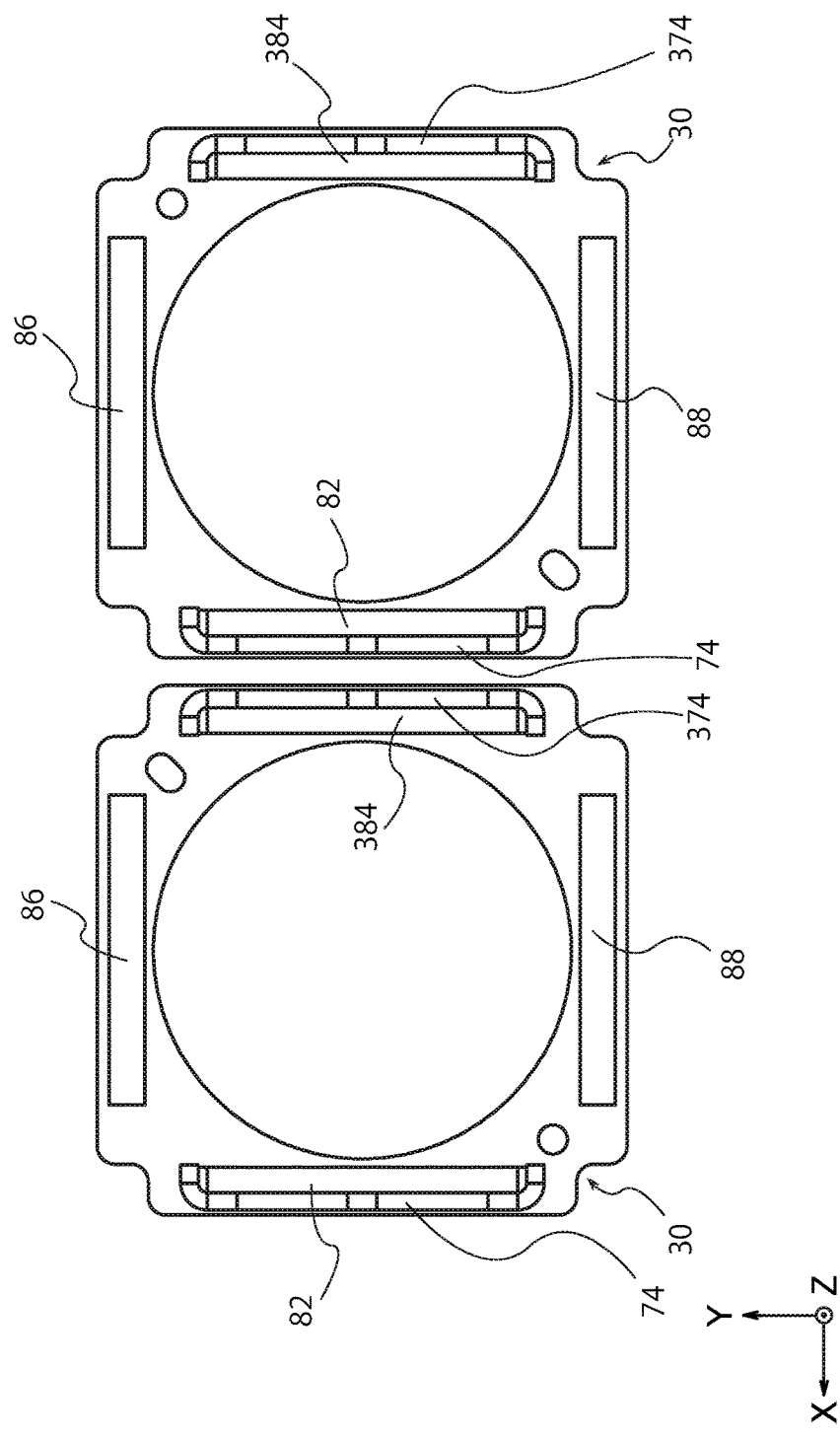
FIG. 13 is a conceptual view showing an arrangement of double-pole magnets and yokes included in an electromagnetic unit according to another variation.

FIG. 13 is a schematic view showing a first magnet 82, a second magnet 84, a third magnet 86, a fourth magnet 88, a FP coil 30, and yokes 74 and 374 of a lens drive device according to another variation. As shown in FIG. 13, the lens drive device according to another variation has two lens drive devices constituting a dual lens drive device. Each of the lens drive devices is different from the lens drive device 2 according to First Embodiment in that the second magnet 384 has a thickness that is identical to a thickness of the first magnet 82, and that the yoke 374 similar to the yoke 74 arranged on the outer side surface of the first magnet 82 is arranged on the outer side surface of the second magnet 384, but each of the lens drive devices is similar to the lens drive device 2 according to First Embodiment in the other matters.

In each of the lens drive devices, the two yokes 74 and 374 are arranged correspondingly to two double-pole magnets arranged in parallel to each other, and magnetic flux can be thereby particularly effectively prevented from leaking toward both sides of the lens drive devices in the width direction (X-axis direction). In such lens drive devices, a dual lens drive device is constituted by arranging two lens drive devices side by side in the X-axis direction, where magnetic flux leaks less, and a magnetic interference that may occur between the devices can be prevented effectively even if other devices, such as antenna and speaker, are arranged side by side in the X-axis direction.

Hereinafter, the present invention is described more specifically with examples, but is not limited to the examples.

Example 1

A magnetic repulsion received by a lens drive device 2 from a lens drive device 102 was measured using an electromagnetic drive unit 110 shown in FIG. 10. The size of the lens drive device 2 used in Example 1 was follows.

First magnets 82 and 182 (double-pole magnets): thickness 0.4 mm, L1/L2=1.0

Second to fourth magnets 84 to 88 and 184 to 188 (double-pole magnets): thickness 0.6 mm, L1/L2=1.0

Yokes 74 and 174: thickness 0.3 mm

Distance between the lens drive device 2 and the lens drive device 102: 1.15 mm

Example 2

The measurement of Example 2 was carried out in the same manner as the measurement of Example 1 except that the thickness of first magnets 82 and 182 used for lens drive devices 2 and 102 was changed to 0.52 mm, and that the yokes 74 and 174 were eliminated.

Comparative Example

The measurement of Comparative Example was carried out in the same manner as the measurement of Example 1 except that first magnets 82 and 182 were changed to a mono-pole magnet having a pair of N-pole and S-pole, and that the yokes 74 and 174 were eliminated.
Evaluation In Comparative Example, it is understood that the lens drive device received a large magnetic repulsion of 100 mN, and that a large magnetic interference was generated between the two lens drive devices. On the other hand, both of the lens drive devices 2 of Example 1 and Example 2 received a magnetic repulsion of 0.2 mN or less, and it is understood that a magnetic interference was significantly reduced by employing a first magnet of a double-pole magnet compared to Comparative Example, which employed a mono-pole magnet. When Example 1 and Example 2 are compared, it is understood that the magnetic interference was reduced by thinning the first magnet and arranging the yoke.

NUMERICAL REFERENCES

2, 102 . . . lens drive device
3a . . . movable portion
3b . . . fixed portion
10 . . . base portion
11 . . . case
11a . . . through hole
12 . . . base opening
14 . . . rectangle
16a to 16d . . . suspension wire
18a, 18b . . . position sensor
20 . . . circuit board
22 . . . board opening
25a to 25d . . . wire connection position
26 . . . wiring
30 . . . FP coil
30a, 30b . . . drive coil
32 . . . FP coil opening
40 . . . lens holder
42 . . . front surface
44 . . . plate spring attachment portion
45 . . . back surface
47 . . . outer circumferential surface
48 . . . inner circumferential surface
50 . . . rear spring
52 . . . frame attachment portion
54 . . . holder attachment portion
55 . . . meandering portion
60 . . . frame
64 . . . front surface
65 . . . attachment convex portion
66 . . . magnet attachment concave portion
68 . . . corner back surface
72 . . . focus coil
74, 174, 274 . . . yoke
80 . . . two-way magnet
82 to 88, 182 to 188, 286 . . . first to fourth magnets
82a, 84a . . . first section
82b, 84b . . . second section
82c . . . inner side surface
82d . . . outer side surface
82da . . . first outer side surface
82db . . . second outer side surface
90 . . . front spring
93 . . . holder attachment portion
94 . . . frame attachment portion
95 . . . meandering portion
100 . . . lens
110 . . . electromagnetic drive unit

The invention claimed is:

1. A lens drive device comprising:
   a movable portion including a double-pole magnet having two pairs of magnetic poles, a first coil opposing to the double-pole magnet in a perpendicular direction to a light axis, and a lens holder holding the first coil and a lens and being movable to the double-pole magnet in a direction of the light axis;
   a fixed portion including a second coil arranged so as to oppose to the double-pole magnet in the direction of the light axis;
   a support portion configured to support the movable portion so that the movable portion is movable relatively to the fixed portion in the perpendicular direction to the light axis; and
   a nonmagnetic case provided with a through hole where light enters into the lens and attached to the fixed portion so as to cover the movable portion,
   wherein the double-pole magnet includes a first section having a first magnetization direction and opposing to the first coil and a second section having a second magnetization direction different from the first magnetization direction and opposing to the second coil, and
   L1/L2 is 0.9 to 1.1, where L1 is a length of the first section in the direction of the light axis, and L2 is a length of the second section in the direction of the light axis.

2. The lens drive device according to claim 1, wherein the movable portion includes a yoke arranged on an outer side surface opposite to an inner side surface facing the first coil among side surfaces of the double-pole magnet.

3. The lens drive device according to claim 2, wherein:
   the yoke covers the whole of a first outer side surface in the first section of the outer side surface and covers a part of a second outer side surface in the second section of the outer side surface, and
   a distance between the yoke and the fixed portion is larger than a distance between the double-pole magnet and the fixed portion.

4. The lens drive device according to claim 2, wherein:
   the movable portion has four double-pole magnets respectively arranged along a side of a rectangle surrounding the lens holder, and
   the movable portion has at least two yokes arranged on an outer side surface opposite to an inner side surface facing the first coil among side surfaces of the double-pole magnet and arranged correspondingly to two double-pole magnets arranged vertically to each other among the four double-pole magnets.

5. The lens drive device according to claim 2, wherein:
   the movable portion has four double-pole magnets respectively arranged along a side of a rectangle surrounding the lens holder, and
   the movable portion has at least two yokes arranged on an outer side surface opposite to an inner side surface facing the first coil among side surfaces of the double-pole magnet and arranged correspondingly to two double-pole magnets arranged in parallel to each other among the four double-pole magnets.

6. The lens drive device according to claim 2, wherein:
the movable portion has four double-pole magnets respectively arranged along a side of a rectangle surrounding the lens holder, and
at least one of the four double-pole magnets is different from another double-pole magnet arranged in parallel to the double-pole magnet with respect to thickness in the perpendicular direction to the light axis.

7. The lens drive device according to claim 6, wherein the movable portion has a yoke arranged on an outer side surface opposite to an inner side surface facing the first coil among side surfaces of the double-pole magnet and arranged correspondingly to the double-pole magnet where the thickness is relatively small.

8. The lens drive device according to claim 3, wherein:
the movable portion has four double-pole magnets respectively arranged along a side of a rectangle surrounding the lens holder, and
the movable portion has at least two yokes arranged on an outer side surface opposite to an inner side surface facing the first coil among side surfaces of the double-pole magnet and arranged correspondingly to two double-pole magnets arranged vertically to each other among the four double-pole magnets.

9. The lens drive device according to claim 3, wherein:
the movable portion has four double-pole magnets respectively arranged along a side of a rectangle surrounding the lens holder, and
the movable portion has at least two yokes arranged on an outer side surface opposite to an inner side surface facing the first coil among side surfaces of the double-pole magnet and arranged correspondingly to two double-pole magnets arranged in parallel to each other among the four double-pole magnets.

10. The lens drive device according to claim 3, wherein:
the movable portion has four double-pole magnets respectively arranged along a side of a rectangle surrounding the lens holder, and
at least one of the four double-pole magnets is different from another double-pole magnet arranged in parallel to the double-pole magnet with respect to thickness in the perpendicular direction to the light axis.

11. The lens drive device according to claim 10, wherein the movable portion has a yoke arranged on an outer side surface opposite to an inner side surface facing the first coil among side surfaces of the double-pole magnet and arranged correspondingly to the double-pole magnet where the thickness is relatively small.

12. The lens drive device according to claim 1, wherein:
the movable portion has four double-pole magnets respectively arranged along a side of a rectangle surrounding the lens holder, and
the movable portion has at least two yokes arranged on an outer side surface opposite to an inner side surface facing the first coil among side surfaces of the double-pole magnet and arranged correspondingly to two double-pole magnets arranged vertically to each other among the four double-pole magnets.

13. The lens drive device according to claim 1, wherein:
the movable portion has four double-pole magnets respectively arranged along a side of a rectangle surrounding the lens holder, and
the movable portion has at least two yokes arranged on an outer side surface opposite to an inner side surface facing the first coil among side surfaces of the double-pole magnet and arranged correspondingly to two double-pole magnets arranged in parallel to each other among the four double-pole magnets.

14. The lens drive device according to claim 1, wherein:
the movable portion has four double-pole magnets respectively arranged along a side of a rectangle surrounding the lens holder, and
at least one of the four double-pole magnets is different from another double-pole magnet arranged in parallel to the double-pole magnet with respect to thickness in the perpendicular direction to the light axis.

15. The lens drive device according to claim 14, wherein the movable portion has a yoke arranged on an outer side surface opposite to an inner side surface facing the first coil among side surfaces of the double-pole magnet and arranged correspondingly to the double-pole magnet where the thickness is relatively small.

16. An electromagnetic drive unit comprising:
the lens drive device according to claim 1; and
an electromagnetic drive device arranged with a predetermined distance to the lens drive device and including an external coil and an external magnet configured to move relatively by electromagnetic drive force,
wherein a magnetic force received by the external coil from the double-pole magnet is smaller than a magnetic force received by the external coil from the external magnet.

17. The electromagnetic drive unit according to claim 16, wherein:
the electromagnetic drive device includes an external lens configured to be driven separately from the lens of the lens drive device by electromagnetic drive force of the external coil and the external magnet, and
the lens drive device and the electromagnetic drive device constitute a dual lens drive device.

* * * * *